(12) United States Patent
Akaishi et al.

(10) Patent No.: US 8,857,400 B2
(45) Date of Patent: Oct. 14, 2014

(54) BALANCER DEVICE FOR AN INTERNAL COMBUSTION ENGINE

(71) Applicant: Honda Motor Co., Ltd., Tokyo (JP)

(72) Inventors: Nobuyuki Akaishi, Wako (JP); Hidehiko Kamiyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 13/673,507

(22) Filed: Nov. 9, 2012

(65) Prior Publication Data

US 2013/0146015 A1   Jun. 13, 2013

(30) Foreign Application Priority Data

Dec. 12, 2011  (JP) ................................. 2011-271769
Dec. 12, 2011  (JP) ................................. 2011-271770

(51) Int. Cl.
  *F16F 7/10*     (2006.01)
  *F16F 15/26*    (2006.01)
  *F02B 75/06*    (2006.01)

(52) U.S. Cl.
  CPC ................. *F16F 7/10* (2013.01); *F16F 15/265* (2013.01); *F02B 75/065* (2013.01)
  USPC ........................ 123/192.2; 123/192.1; 74/604

(58) Field of Classification Search
  CPC ....... F02B 75/06; F16F 15/264; F16F 15/265; F16F 15/267
  USPC ........................ 123/192.1, 192.2; 74/603, 604
  See application file for complete search history.

(56) References Cited

U.S. PATENT DOCUMENTS

| | | | | |
|---|---|---|---|---|
| 5,535,643 A | * | 7/1996 | Garza | 74/603 |
| 5,788,381 A | * | 8/1998 | Yamazaki et al. | 384/400 |
| 5,791,309 A | * | 8/1998 | Yamazaki et al. | 123/192.2 |
| 6,305,339 B1 | * | 10/2001 | Iwata et al. | 123/192.2 |
| 6,758,183 B2 | * | 7/2004 | Endo et al. | 123/192.2 |
| 2003/0075136 A1 | * | 4/2003 | Inaba et al. | 123/192.2 |
| 2011/0283966 A1 | * | 11/2011 | Zwickler et al. | 123/196 R |

FOREIGN PATENT DOCUMENTS

JP    3643506 B2     4/2005
JP    2010-60076 A   3/2010

OTHER PUBLICATIONS

Japanese Office Action; Japanese Patent Application No. 2011-271769 dated Aug. 5, 2013.

* cited by examiner

*Primary Examiner* — Noah Kamen
*Assistant Examiner* — Grant Moubry
(74) *Attorney, Agent, or Firm* — Mori & Ward, LLP (57) ABSTRACT

In a balancer device (10) including a pair of balancer shafts (11, 21), the radial bearings (41-44) for the balancer shafts are formed solely in the balancer housing (30) and/or an integral extension (52) thereof. Because a pump cover (56) provided separately from the balancer housing does not include a radial bearing for either balancer shaft, the pump cover is not required to be attached to the balancer housing when machining the radial bearing bores in the balancer housing so that the manufacturing process is simplified, and the coaxiality of the bearing halves for each balancer shaft can be ensured without difficulty as opposed to the case where the pump cover is provided with a bearing bore which is required to be aligned with the corresponding bearing bore of the balancer housing.

12 Claims, 10 Drawing Sheets

BALANCER DEVICE FOR AN INTERNAL COMBUSTION ENGINE

TECHNICAL FIELD

The present invention relates to a balancer device for an internal combustion engine, and in particular to a balancer device having a balancer housing integrally incorporated with a pump housing for a lubricating oil pump in an axial end part thereof.

An automotive reciprocating internal combustion engine is often incorporated with a balancer device for cancelling engine vibrations caused by the reciprocating movement of the pistons. A balancer device typically comprises a pair of balancer shafts extending in parallel to each other, and fitted with balancer weights. The balancer shafts are located in the oil pan under the crankshaft. One of the balancer shafts or drive balancer shaft is rotatively actuated by the crankshaft via a suitable power transmission mechanism such as a sprocket and chain mechanism, and the other balancer shaft or the driven balancer shaft is connected to the drive balancer shaft via a gear mechanism that causes the two balancer shafts to rotate at a same speed in opposite directions. Normally, the balancer shafts rotate at twice the rotational speed of the crankshaft.

The balancer device may also be incorporated with an oil strainer, an oil pump and an inlet passage for connecting the oil strainer with the oil pump. The balancer housing typically consists of an upper housing and a lower housing which are joined to each other at a horizontal interface that passes through the center lines of the balancer shafts. The oil pump (or the pump rotor thereof) is connected to an axial end of the driven balancer shaft extending from an end face of a pump housing which is integrally formed with the lower housing at an axial end thereof. A pump cover is attached to the end face of the pump housing to define a pump chamber within the pump housing. Such a balancer device is disclosed in JP 3643506B, for instance.

In the previously proposed balancer device, the pump chamber for receiving the outer rotor of the pump is formed in the pump cover which is formed separately from the balancer housing, and the pump cover is provided with a radial bearing for supporting the pump shaft extending from the inner rotor. Therefore, some effort was necessary in precisely aligning the center of the radial bearing in the pump cover and the center of the radial bearing in the balancer housing. As such an effort, the bearing bore of the pump cover may be machined while the pump cover is attached to the balancer housing.

However, after machining the bearing bore in the pump cover, the pump cover has to be removed so that the balancer shafts may be installed, and the pump cover has to be attached to the balancer housing once again thereafter. Even when positioning pins or other measures may be employed in properly positioning the pump cover with respect to the balancer housing, it is highly difficult to totally eliminate errors in the alignment of the axial center of the bearing bore in the pump cover with that of the balancer housing. Any misalignment in the bearing bores leads to undesired consequences such as noises and reduced service life.

When a balancer device is incorporated with a pump for engine lubricating oil at an axial end thereof, the balancer housing may be internally formed with passages for communicating the oil pump with an oil strainer and other parts of the engine. Typically, the balancer housing consists of an upper housing and a lower housing which are joined to each other at an interface extending horizontally and passing through the axial centers of the balancer shafts, and a side wall of the lower housing is internally formed with an inlet passage for the oil pump extending from a strainer mounted on the bottom wall of the lower housing to the inlet end of the pump. See JP3643506B, for instance.

The strainer is fitted into a cylindrical wall extending downward from the bottom wall of the lower housing, and a communication hole is passed through the wall part that separates the recess defined within the cylindrical wall from the inlet passage formed in the lower housing. However, to ensure an adequate cross sectional area for this communication hole with the aim of adequately reducing the flow resistance of the oil which is being drawn into the pump, a communication hole of a large diameter is required, but this causes the height of the cylindrical wall and/or the inlet passage to be increased so that the overall heights of the balancer housing and the oil pan have to be increased in a corresponding manner. The cross sectional area of the communication hole may be increased without increasing the overall height by using a communication hole having a large lateral dimension as compared with the vertical dimension, but this in turn requires a costly machining process. Furthermore, provision of such a large communication hole may undesirably reduce the stiffness and mechanical strength of the balancer housing.

SUMMARY OF THE INVENTION

To eliminate such problems of the prior art, a primary object of the present invention is to provide a balancer device for an internal combustion engine which is easy to assemble while ensuring a high level of precision in the bearings for the balancer shafts.

A second object of the present invention is to provide a balancer device for an internal combustion engine in which radial bearings for the balancer shafts are arranged in an advantageous manner.

A third object of the present invention is to provide a balancer device for an internal combustion engine which is incorporated with an oil pump and is provided with an inlet passage for the oil pump demonstrating a minimum resistance to the oil being drawn into the pump.

At least part of these objects can be accomplished by providing a balancer device for an internal combustion engine, comprising: a pair of balancer shafts, including a drive balancer shaft and a driven balancer shaft, each incorporated with a balancer weight and disposed in parallel to each other, the two balancer shafts being coupled such that the two balancer shafts rotates both at twice the rotational speed of the engine in opposite directions; a lower housing including a pair of bearing lower halves for each balancer shaft; an upper housing configured to be joined to the lower housing so as to form a balancer housing, the upper housing including bearing upper halves corresponding to the bearing lower halves of the lower housing for jointly forming radial bearings for the balancer shafts; a pump housing integrally formed at an axial end of one of the upper and lower housings as an integral extension thereof to internally define a part of a pump chamber of an oil pump; a pump cover joined to the pump housing from an outer axial end thereof to jointly define the pump chamber with the pump housing; and a pump rotor received in the pump chamber; wherein an axial end of the driven balancer shaft adjoining the pump housing is coupled with the pump rotor, and an axial end of the drive balancer shaft is provided with a member which is configured to be actuated by a crankshaft of the engine, the radial bearings for the balancer shafts being formed solely in the balancer housing and/or an integral extension thereof.

Because the pump cover does not include a radial bearing for either balancer shaft, the pump cover is not required to be attached to the balancer housing when machining the radial bearing bores in the balancer housing, and this simplifies the manufacturing process. As the bearing halves are required to be formed only in the balancer housing and/or an extension thereof, the coaxiality of the bearing halves for each balancer shaft can be ensured without difficulty as opposed to the case where the pump cover is provided with a bearing bore which is required to be aligned with the corresponding bearing bore of the balancer housing. Thereby, the manufacturing process can be simplified. Furthermore, the clearance in the radial bearings can be minimized so that the consumption of lubricating oil in each radial bearing is minimized, and a shortfall in the output of the oil pump can be avoided.

According to a certain aspect of the present invention, the oil pump is received in the pump housing, and the pump rotor is connected to the axial end of the driven balancer shaft via a detachable shaft coupling so that the assembling of the balancer device combined with the oil pump is facilitated.

According to another aspect of the present invention, the radial bearing for the drive balancer shaft most adjacent to the pump housing is offset toward the pump housing than the radial bearing for the driven balancer shaft most adjacent to the pump housing. Thereby, the drive balancer shaft can be supported radially near the member which is actuated by the crankshaft of the engine so that the large load that is inevitably applied to this member can be supported by the radial bearings of the drive balancer shaft in an efficient manner.

According to a preferred embodiment of the present invention, the balancer housing is provided with four radial bearings for the two balancer shafts, two formed in a common bearing wall extending perpendicularly to the balancer shafts in an axial end of the balancer housing remote from the pump housing, and remaining two formed in an axial end of the balancer housing adjacent to the pump housing in a mutually axially offset manner. In particular, the pump housing may be formed integrally with the lower housing, and may include a lateral extension defining an oil passage for the oil pump therein. Also, a part of the axial end of the driven balancer shaft adjacent to the pump housing may be exposed from the balancer housing while the pump housing is provided with a radial bearing for rotatably supporting a pump shaft extending from the pump rotor.

According to yet another aspect of the present invention, one of the radial bearings for the driven balancer shaft is formed in a bearing wall of the balancer housing, and the driven balancer shaft includes a journal supported by the said radial bearing and a pair of balancer weight parts of the balancer weight formed on either side of the journal so as to be engaged by end surfaces of the bearing wall, and wherein the axial end of the driven balancer shaft adjacent to the pump housing is coupled with an opposing axial end of the pump shaft via a shaft coupling that can be engaged and disengaged by a relative lateral movement between the two opposing axial ends of the driven balancer shaft and the pump shaft.

Thereby, the load of the balancer weight can be supported at where the imbalance load of the balancer shaft is produced in a highly efficient manner. This arrangement prevents the axial movement of the balancer shaft during the assembly process, but the assembling process is not complicated by this structure thanks to the use of the shaft coupling that can be engaged and disengaged by a relative lateral movement between the two opposing axial ends of the driven balancer shaft and the pump shaft.

According to yet another aspect of the present invention, the radial bearing formed in the end of the balancer housing adjacent to the pump housing for the driven balancer shaft is formed in an end wall of the balancer housing, and the radial bearing formed in the end of the balancer housing adjacent to the pump housing for the drive balancer shaft is formed in a lateral extension of the pump housing.

Thereby, the radial bearings for the balancer shafts on the side of the pump housing can be placed in an axially offset relationship by using a both compact and simple structure.

According to yet another aspect of the present invention, the balancer housing includes a tubular wall extending along a side of the balancer housing adjacent to the driven balancer shaft and internally defining an axial passage, and a cylindrical wall extending downward from a bottom wall of the balancer housing in a contiguous relationship so as to serve as a strainer mount, a communication hole being passed through a partition wall separating a recess defined inside the cylindrical wall and the axial passage.

The tubular wall is effective in increasing the stiffness and mechanical strength of the balancer shaft. Even though the tubular wall can be relatively simply formed by using a metal casting process, the communication passage involving a relatively low flow resistance can be formed from the strainer to the oil pump simply by drilling or otherwise forming a communication hole through the partition wall separating the recess defined inside the cylindrical wall and the axial passage. Preferably, at least two communication holes are passed through the partition wall separating the recess defined inside the cylindrical wall and the axial passage, one next to the other along the axial direction so that a large cross sectional area can be ensured to the communication passages without increasing the vertical dimensions of the tubular wall and/or the cylindrical wall, and without unduly reducing the mechanical strength of the part of the balancer housing surrounding the partition wall.

Preferably, the upper and lower housings are separated by a substantially horizontal interface, and the tubular wall is disposed between the interface and an effective bottom surface of the lower housing in terms of elevation so that the vertical dimension of the lower housing and hence the vertical dimension of the oil pan may be minimized.

With the aim of effectively increasing the stiffness and mechanical strength of the bottom wall of the balancer housing, and optimizing the contribution of the provision of the tubular wall to the stiffness and mechanical strength of the balancer housing, the lower housing may be provided with a pair of part cylindrical wall parts in a bottom wall part thereof so as to correspond to the two balancer shafts while the tubular wall is at least partly directly connected to one of the part cylindrical wall part.

BRIEF DESCRIPTION OF THE SEVERAL VIEWS OF DRAWINGS

Now the present invention is described in the following with reference to the appended drawings, in which.

DETAILED DESCRIPTION OF THE INVENTION

A balancer device 10 embodying the present invention is described in the following with reference to the appended drawings. This balancer device 10 is applied to an in-line, four-cylinder automotive engine 1.

Figure 1:
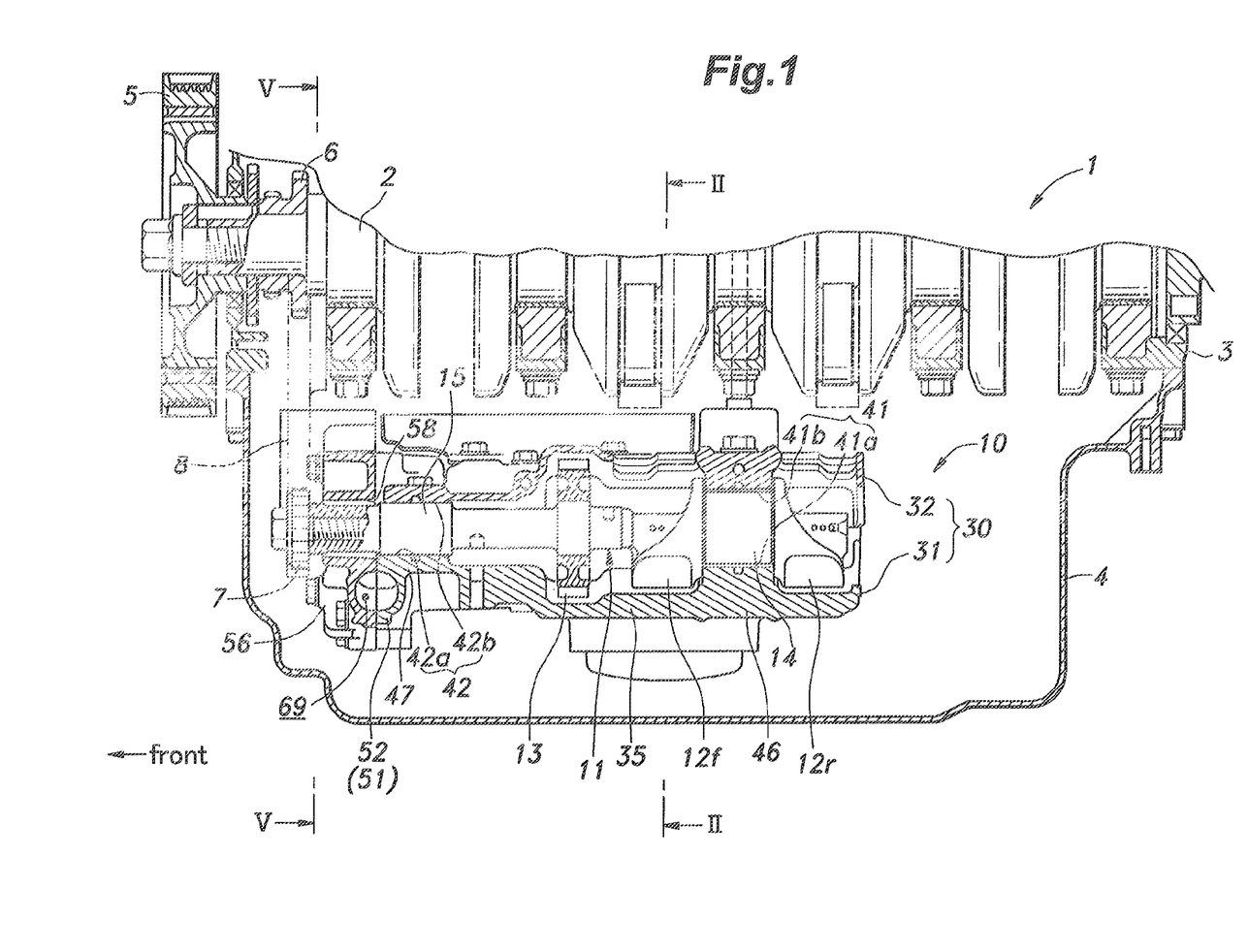
FIG. 1 is a fragmentary sectional view of an engine incorporated with a balancer device embodying the present invention taken along the axial line of a drive balancer shaft.
Figure 2:
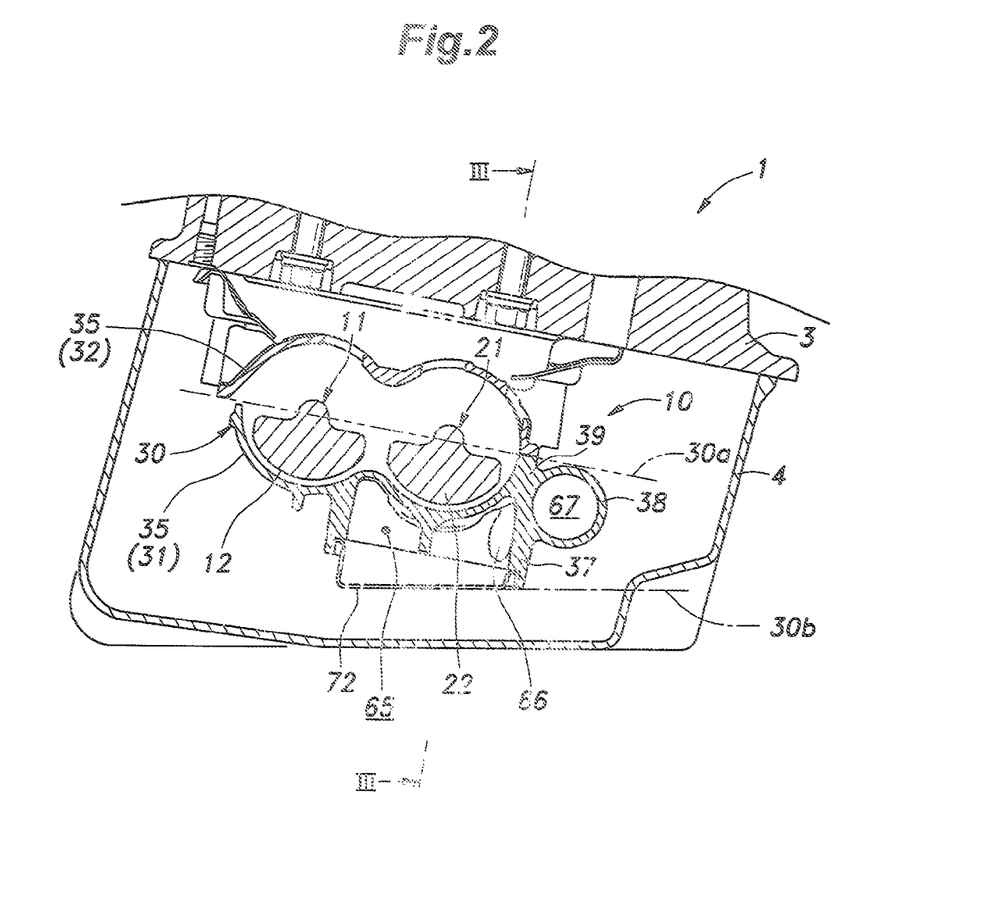
FIG. 2 is a sectional view taken along line II-II of FIG. 1.

Referring to FIGS. 1 and 2, the engine 1 has a crankshaft 2 extending horizontally in the lateral direction with respect to the vehicle body (not shown in the drawings), and further includes a lower block 3 and an oil pan 4 in a per se known arrangement. The balancer device 10 is substantially received in the oil pan 4. The engine 1 is mounted on the vehicle with the cylinder axial line tilted rearward as shown in FIG. 2.

The balancer device 10 of the illustrated embodiment is designed to minimize the second order vibration of the engine 1 caused by the reciprocating movement of the pistons, and includes a drive balancer shaft 11 and a driven balancer shaft 21 provided with substantially identical balancer weights 12 and 22, respectively, and a balancer housing 30 that supports the balancer shafts 11 and 21 in parallel to each other in a freely rotatable manner. The balancer housing 30 consists of a lower housing 31 and an upper housing 32 that are joined to each other at an interface passing through the center lines of the balancer shafts 11 and 21. The balancer device 10 is attached to the lower face (below the crankshaft 2) of the lower block 3 by threaded bolts passed upward through a plurality of bolt receiving holes 16 (see FIG. 4) passed through in suitable parts of the balancer housing 30.

Figure 3:
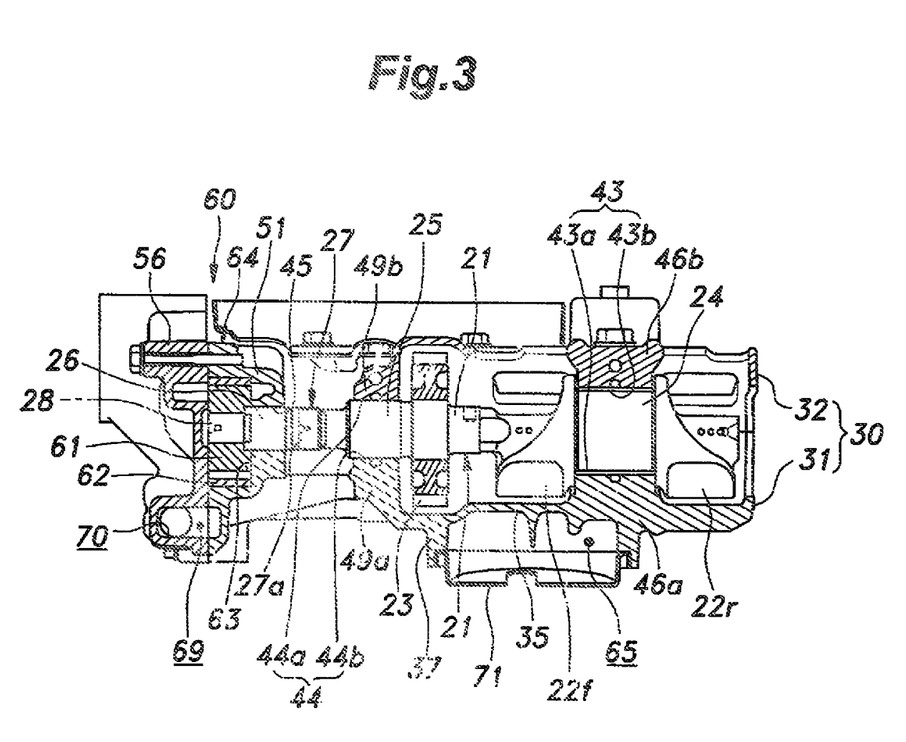
FIG. 3 is a sectional view of the balancer device taken along line III-III of FIG. 2.
Figure 4:
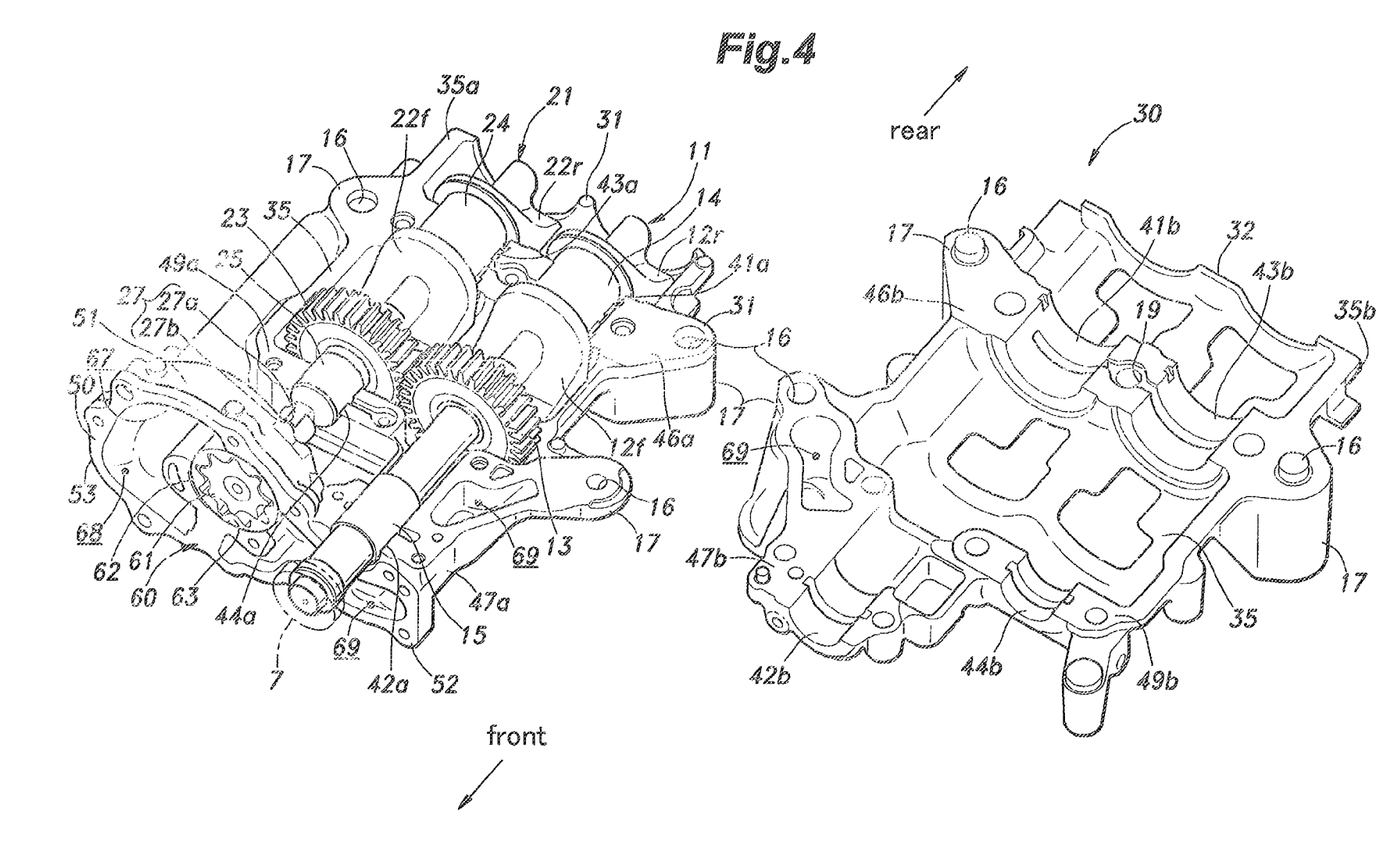
FIG. 4 is an exploded perspective view of the balancer device.

As shown in FIG. 1, a crank pulley 5 is attached to an end of the crankshaft 2 extending out of the engine 1, and a large sprocket 6 is fitted on a part of the crankshaft 2 immediately behind the crank pulley 5 inside the engine 1. A free end of the drive balancer shaft 11 which is located ahead of the free end of the driven balancer shaft 21 is fitted with a small sprocket 7 by using a threaded bolt, and a link chain 8 is passed around the two sprockets 6 and 7 so that the drive balancer shaft 11 is rotatively actuated at twice the rotational speed of the crankshaft 2. As shown in FIGS. 1, 3 and 4, the two balancer shafts 11 and 21 are caused to rotate at the same rotational speed in opposite directions by the meshing of helical gears 13 and 23 integrally fitted on middle parts of the respective balancer shafts 11 and 21.

Each balancer shaft 11, 21 is formed with a first journal portion 14, 24 of a relatively large diameter to the rear of the corresponding helical gear 13, 23, and a second journal portion 15, 25 of a relatively small diameter ahead of the corresponding helical gear 13, 23. The balancer weight of each balancer shaft 11, 21 is separated into a pair of balancer weight parts 12*f*, 12*r*, 22*f*, 22*r* on either side of the corresponding first journal portion 14, 24.

The lower housing 31 is provided with a first bearing wall 46 (or a lower half 46*a* of the first bearing wall 46) extending perpendicularly to the axial line of the balancer shafts 11 and 21 adjacent to the rear end of the lower housing 31, and a pair of first bearing halves 41*a* and 43*a* are formed in the first bearing wall 46*a* for the first journal portions 14 and 44 of the two balancer shafts 11 and 21. The lower housing 31 is provided with a second bearing wall 49*a* extending perpendicularly to the axial line of the balancer shafts 11 and 21 adjacent to the front end of the lower housing 31. The second bearing wall 49*a* defines a bearing half 44*a* for the second journal portion 25 of the driven balancer shaft 21, and a recess defining a space for the drive balancer shaft 11. The lower housing 31 is additionally provided with a pump housing 51 located ahead of the front end of the driven balancer shaft 21 and a third bearing wall 47*a* located laterally next to the pump housing 51 on the outer side of the second bearing wall 49*a*. The pump housing 51 is incorporated with a pump body 64 which aligns with the axial center line of the driven balancer shaft 21, and the third bearing wall 47*a* is formed with a bearing half 42*a* for the second journal portion 15 of the drive balancer shaft 11. Therefore, the distance between the first and second bearings for the drive shaft 11 is larger than the distance between the first and second bearings for the driven shaft 21.

The upper housing 32 is formed with corresponding bearing halves 41*b*, 42*b*, 43*b* and 44*b* such that a first bearing 41, 43 and a second bearing 42, 44 for the first journal portion 14, 24 and the second journal portion 15, 25 of each of the balancer shafts 11 and 21, respectively, are formed when the upper and lower housings 31 and 32 are combined with each other. In particular the first bearings 41 and 43 are laterally aligned with each other (or are not axially offset from each other) while the second bearings 42 and 44 are axially offset from each other. The upper housing 32 is additionally provided with upper halves of the bearings walls 46*b*, 49*b* and 47*b* that form the full bearings walls 46, 49 and 47 in cooperation with the lower halves of the bearings walls 46*a*, 49*a* and 47*a* of the lower housing 31. The part of the upper housing 32 corresponding to the pump housing 51 of the lower housing 31 is devoid of any member (or is cut out).

Each balancer shaft 11, 21 is formed with a pair of radial flanges on either axial end of the first journal 14, 24 such that the end surfaces of the radial flanges facing away from the first journal portion 14, 24 provide thrust bearing surfaces in cooperation with the end surfaces of the first hearing wall 46. In other words, the first bearing wall 46 provides not only the radial bearing but also a thrust bearing for the first journal portion 14, 24 of each balancer shaft 11, 21. In this particular case, the first bearings 41 and 43 are laterally aligned with each other (is not axially offset from each other) while the second bearings 42 and 44 are axially offset from each other.

The upper and lower housings 31 and 32 are combined as described in the following. The first and second journal portions 14, 15, 24 and 25 of the two balancer shafts 11, 21 are placed on the corresponding bearing halves 41*a*, 42*a*, 43*a* and 44*a* (as shown in FIG. 4), and the upper housing 32 is placed on the lower housing 31 with the upper bearing halves 41*b*, 42*b*, 43*b* and 44*b* of the upper housing 32 applied to the second journal portions 14, 15, 24, 25 of the two balancer shafts 11 and 21 resting on the lower halves 41*a*, 42*a*, 43*a* and 44*a* of the lower housing 31. Thereafter, the bolts are passed through the corresponding bolt holes 16 and fastened. Thereby, the two balancer shafts 11 and 21 are received in the balancer housing 30 in a freely rotatable manner. At this time, the first bearing wall 46 not only provide radial bearing surfaces for the first journal portions 14 and 24 but also thrust bearing surfaces for the end surfaces of the radial flange portions of the balancer weights 12 and 22.

The balancer housing 30 also includes a shaft surrounding wall 35 which includes a first part extending between the first bearing wall 46 and the second bearing wall 49 and surrounding the helical gears and the front weight parts 12*f* and 22*f* of the balancer shafts 11 and 21, a second part extending between the second bearing wall 49 and the third bearing wall 47 and surrounding the part of the drive balancer shaft 11 located between the helical gear 13 and the second journal portion 15, and a third part extending axially outward from the first bearing wall 46 (surrounding the rear weight parts 12r and 22r of the balancer shafts 11 and 21).

As shown in FIGS. 3 and 4, the pump housing 51 is incorporated with a trochoid oil pump 60 for feeding lubricating oil to various parts of the engine. This oil pump 60 is configured to be driven by the opposing end of the driven balancer shaft 21. More specifically, the pump housing 51 is integrally formed with the lower housing 31 so as to extend above the interface between the upper and lower housings 31 and 32, and internally defines a part of a cylindrical pump chamber 63. The pump housing 51 is spaced from the second bearing wall 49, and the driven balancer shaft 21 is exposed from a gap between the pump housing 51 and the second bearing wall 49.

A pump cover 56 is attached to the front end surface of the pump housing 51 by using threaded bolts, and defines the remaining part of the cylindrical pump housing 51. The pump chamber 63 receives therein an inner rotor 61 having a central pump shaft 28, and an outer rotor 62 rotatably supported by the inner circumferential surface of the pump chamber 63. The inner rotor 61 and the outer rotor 62 are configured and combined as are normally the case with those of a per se known trochoid pump.

The pump shaft 28 is provided with a third journal 26 extending toward the driven balancer shaft 21. The third journal 26 is rotatably supported by a radial bearing 45 formed in the pump housing 51 as a bearing bore passed through the vertical wall of the pump housing 51. The front axial end face of the driven balancer shaft 21 is formed with a key 27a extending diametrically across the axial end face thereof. The opposing axial end face of the third journal 26 facing the driven balancer shaft 21 is formed with a corresponding key slot 27b extending diametrically across the axial end face of thereof. The key 27a engages the key slot 27b formed on the opposing end face of a pump shaft 28 so that the oil pump 60 is actuated by the driven balancer shaft 21. Thus, the rotation of the driven balancer shaft 21 causes the oil in the oil pan to be fed to various parts of the engine under pressure.

Owing to the use of this key coupling, the driven balancer shaft 21 can be assembled to the lower housing 31 with the pump shaft 28 already supported by the third bearing 45 in the pump housing 51 by placing the driven balancer shaft 21 on the lower halves 43a and 44a of the first and second bearings 43 and 44 such that the key 27a is passed into the slot 27b from sideways, before placing the upper housing 32 on the lower housing 31. As can be readily appreciated by a person skilled in the art, the key may be formed in the pump shaft 28 while the key slot is formed in the driven balancer shaft 21 without departing from the spirit of the present invention. Furthermore, this shaft coupling may consist of any other type of shaft coupling as long as the driven balancer shaft 21 can be coupled to the pump shaft 28 laterally or otherwise without requiring the axial movement of the driven balancer shaft 21.

As shown in FIG. 4, the pump housing 51 includes a first lateral extension 52 extending under the drive balancer shaft 11 and internally defining an outlet passage 69 of the oil pump 60 in cooperation with the pump cover 56 and a corresponding lateral extension formed in the upper housing 30 (without a numeral). The pump housing 51 further includes a second lateral extension 53 bulging laterally outward in opposite direction and defining a downstream end of an inlet passage 68 of the oil pump 60 also in cooperation with the pump cover 56. The first lateral extension 52 is integrally connected to a lower part of the front end of the lower housing 31, and defines the lower half 42a of second bearing 42 of the drive balancer shaft 11. In other words, the lower half 42a of the second hearing 42 of the drive balancer shaft 11 is formed in an upper part of the first lateral extension 52. Also, the second lateral extension 53 is integrally connected to an adjacent lateral end part of the lower housing 31 via a connecting portion 36 (see FIG. 6) consisting of a planar wall member formed as a continuation of the bottom wall of the lower housing 31 and reinforced by ribs.

Figure 5:
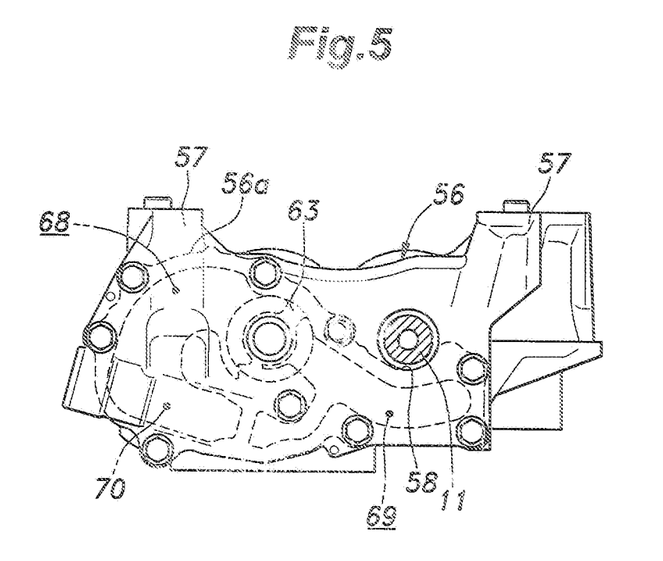
FIG. 5 is a sectional view taken along line V-V of FIG. 1.

As shown in FIG. 5, the pump cover 56 is provided with a mating face 56a configured to be joined to the axial end face of the pump housing 51 so as to define the front end of the pump chamber 63, in addition to the outlet passage 69 and the downstream end of the inlet passage 68 of the oil pump 60. A valve chamber 70 is formed under the pump chamber 63 so as to communicate the outlet passage 69 and the inlet passage 68 with each other, and slidably receives therein a relief valve (not shown in the drawings) consisting of a per se known plunger valve so that excess pressure in the outlet passage 69 is returned to the inlet passage 68. A bolt boss 57 is provided in each of the lateral end parts of the pump cover 56, and a bolt hole 16 (see FIG. 6) is passed through each bolt boss 57 for securing the pump cover 56 to the lower block 3. The upper face of each bolt boss 27 defines a part of the upper surface of the balancer device 10. The part of the pump cover 56 corresponding to the drive balancer shaft 11 is formed with a through hole 58 having a greater inner diameter than the outer diameter of the drive balancer shaft 11 so that the drive balancer shaft 11 may be passed through the pump cover 56 without touching the pump cover 56.

As shown in FIG. 1, the front end of the drive balancer shaft 11 projects further out than the balancer housing 30 and the first lateral extension 52 of the pump housing 51, and projects out of the balancer housing 30 via the through hole 58 beyond the front end surface of the pump cover 56. The outer end of the drive balancer shaft 11 is fitted with the small sprocket 7 by using a threaded bolt. Once the drive balancer shaft 11 is placed on the lower halves 41a and 42a of the first and second bearings 41 and 42 on the lower housing 31, because the opposing axial end surfaces of the two balancer weight parts 12f and 12r bear upon the opposing thrust bearing surfaces of the first bearing wall 46, the drive balancer shaft 11 is immobile in the axial direction. Therefore, if the pump cover 56 were provided with a radial bearing for the drive balancer shaft 11, the drive balancer shaft 11 could not be assembled or removed while the pump cover 56 is attached to the lower housing 31. On the other hand, according to the present invention, the pump cover 56 does not include any radial bearing for the drive balancer shaft 11, even when the pump cover 56 is already attached to the lower housing 31 the drive balancer shaft 11 can be assembled or removed provided that the through hole 58 of the pump cover 56 is made large enough.

Thus, the balancer housing 30, the pump housing 51 and the pump cover 56 are thus configured such that the two balancer shafts 11 and 21 are supported solely by the balancer housing 30 and the lateral extension 52.

Figure 6:
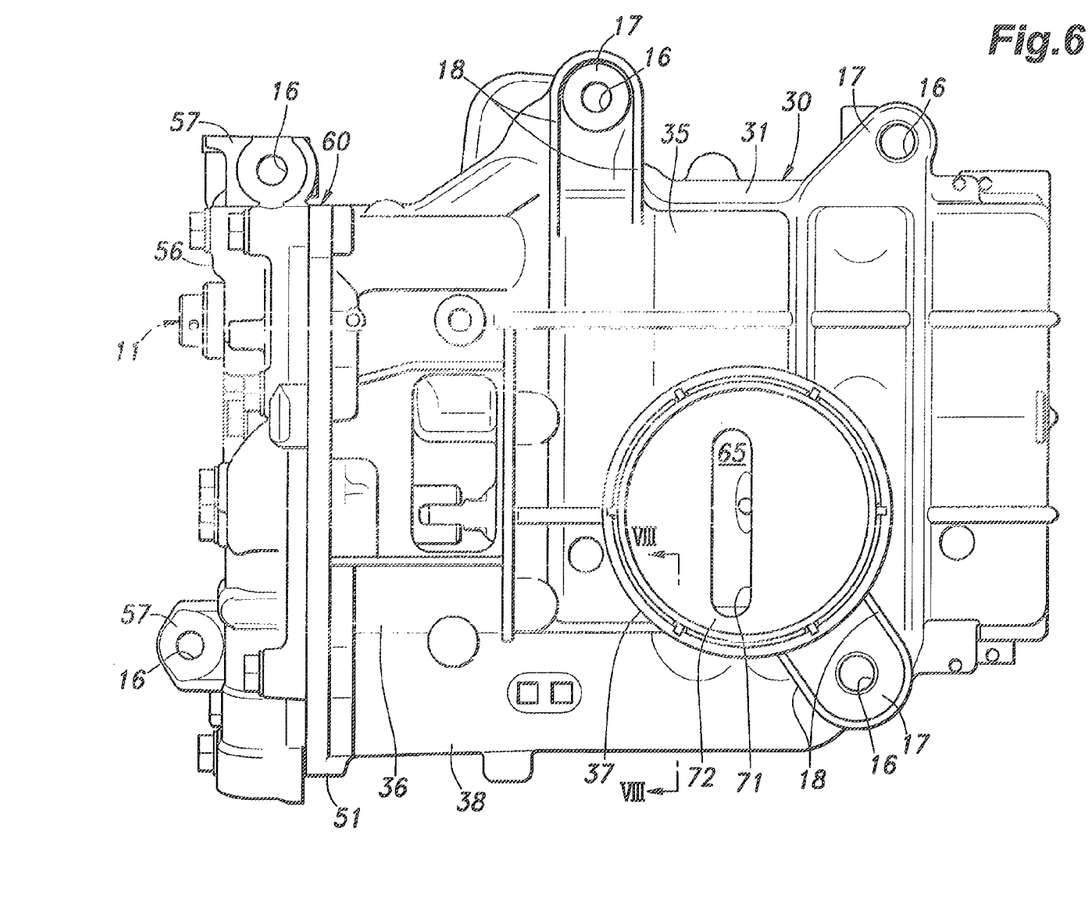
FIG. 6 is a bottom view of the balancer device.

As shown in FIGS. 2, 3 and 6, the bottom wall of the balancer housing 30 is provided with a cylindrical wall 37 extending downward from the part of the bottom wall surrounding the inlet hole 71. The bottom wall is otherwise curved so as to closely surround the trajectory of the balancer weights 12 and 22 (thereby defining a pair of part cylindrical wall parts extending in parallel to each other so as to correspond to the two balancer shafts), and the cylindrical wall 37 is centered around a lowest point of the bottom wall. Thus, a recess 65 is defined by the cylindrical wall 37 in cooperation with the bottom wall. A strainer cover 72 (FIG. 2) made of stamp formed steel plate is press fitted into the inner periphery of the cylindrical wall 37, and a laterally elongated inlet hole 71a is formed in the strainer cover 72.

As shown in FIG. 2, a tubular wall 38 defining an axial passage 67 is integrally formed with the lower housing 31 along a side part thereof on the side of the driven balancer shaft 21 such that the tubular wall 38 is located between the interface 30a between the lower and upper housings 31 and 32, and the lower end surface 30b of the lower housing 31 in terms of elevation, and connected to the shaft surrounding wall 35 and the planar connecting wall 36 (FIG. 6). The tubular wall 38 merges with a part of the cylindrical wall 37 so as to define a partition wall 39 separating the axial passage 67 from the interior of the recess 65.

Figure 7:
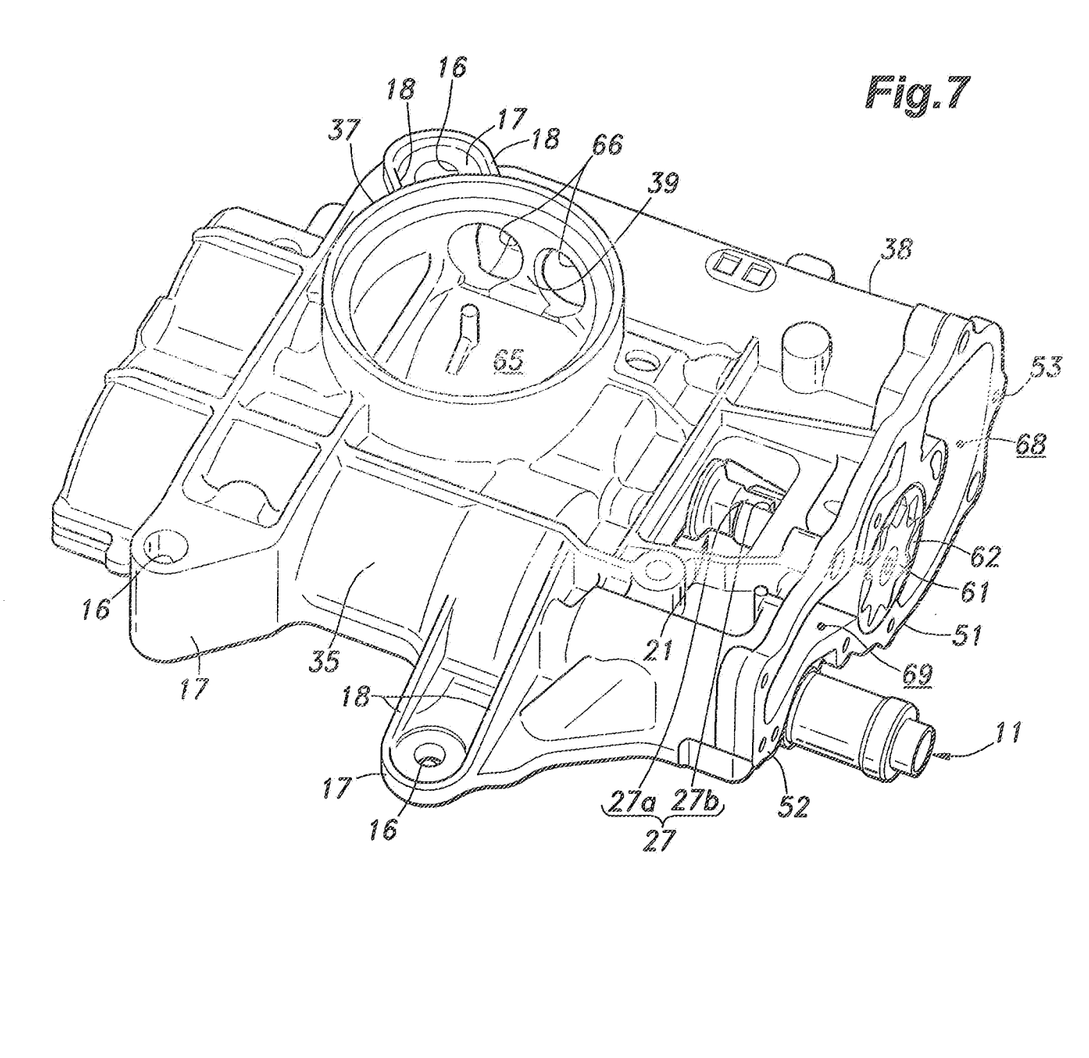
FIG. 7 is a perspective view of the balancer device as seen from below.
Figure 8:
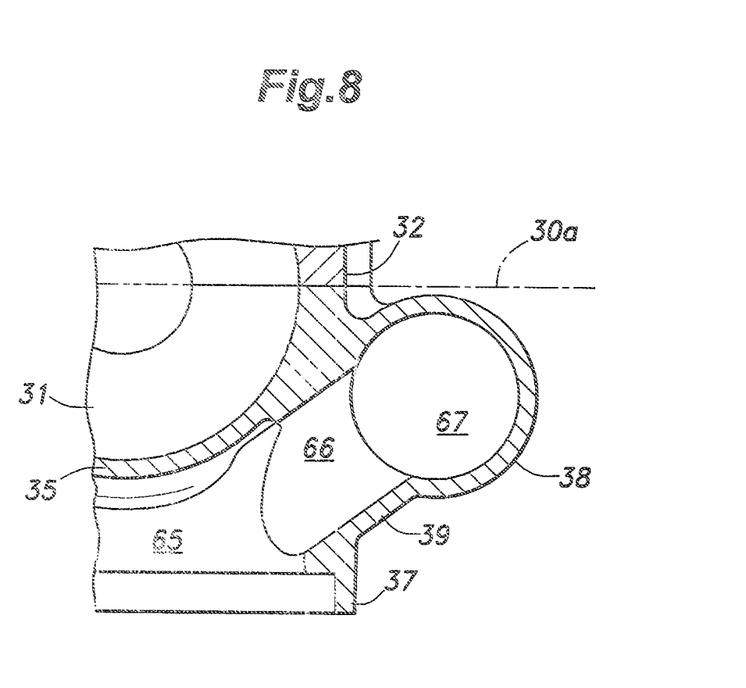
FIG. 8 is an enlarged sectional view taken along line VIII-VIII of FIG. 6.

As shown in FIGS. 7 and 8, the partition wall 39 is provided with a pair of communication holes 66 arranged horizontally or axially next to each other to communicate the axial passage 67 with the interior of the recess 65. The pump cover 56, the lower housing 31 (incorporated with the pump housing 51) and the upper housing 32 may consist of die cast aluminum alloy, and the axial passage 67 and the downstream end of the inlet passage 68, and the valve chamber 70 of the pump cover 56 are formed by using casting cores. The communication holes 66 can be formed by drilling.

As shown in FIGS. 6 and 7, there are five bolt holes 16 for securing the balancer device 10 to the lower block 3 of the engine 1, two on either lateral end of the pump cover 56, two on either lateral end of the first bearing wall 46 and one on a terminal end (adjoining the lower block 3) of the first lateral extension 52 (near the downstream end of the outlet passage 69) (FIG. 4). The bolt hole 16 adjacent to an outer part of the downstream end of the outlet passage 69 is surrounded by a relatively thin-walled boss portion 17 which is reinforced by a pair of ribs 18 extending between the boss portion 17 and the shaft surrounding wall 35. Each of the bolt holes 16 on either lateral end of the first bearing wall 46 is surrounded by a relatively thick-walled boss portion 17 as it requires a relatively high stiffness. One of the boss portions 17 on either lateral end of the first bearing wall 46 is connected to the cylindrical wall 37 by a pair of ribs 18 to further increase the strength and stiffness of attachment of the balancer housing 30 to the lower block 3 of the engine 1.

In the illustrated embodiment, the upper and lower housings 31 and 32 are joined to each other also by the threaded bolts that secure the balancer housing 30 to the lower block 3 in addition to bolt holes adjacent to the radial bearings for joining the upper and lower housings 31 and 32 to each other. However, separate sets of bolts may be used for joining the upper and lower housings 31 and 32, and attaching the balancer housing 30 to the lower block 3.

As the driven balancer shaft 21 along with the oil pump 60 rotates, lubricating oil is drawn into the pump body 64 via the oil strainer, the recess 65, the communication holes 66 and the axial passage 67, and expelled into the outlet passage 69 under pressure. The lubricating oil is forwarded to an oil passage in the lower block 3 from the downstream end of the outlet passage 69 opening out to the upper end of the balancer housing 30, and is then distributed to various parts of the engine 1.

As the two balancer shafts 11 and 21 are supported solely by the balancer housing 30 and the lateral extension 52 of the pump housing, the need for attaching the pump cover 56 to the balancer housing 30 before machining the bearings 41 to 44 is eliminated, and the assembling process is simplified. The two halves of the radial bearings for the two balancer shafts are formed only in the balancer housing 30 (and the extension) so that the centering precision is prevented from being impaired by the need to reassemble the balancer housing 30 during the fabrication process of the balancer device. Thereby, the clearance in the bearings is minimized so that the consumption of the lubricating oil by the bearings can be minimized.

Figure 9A:
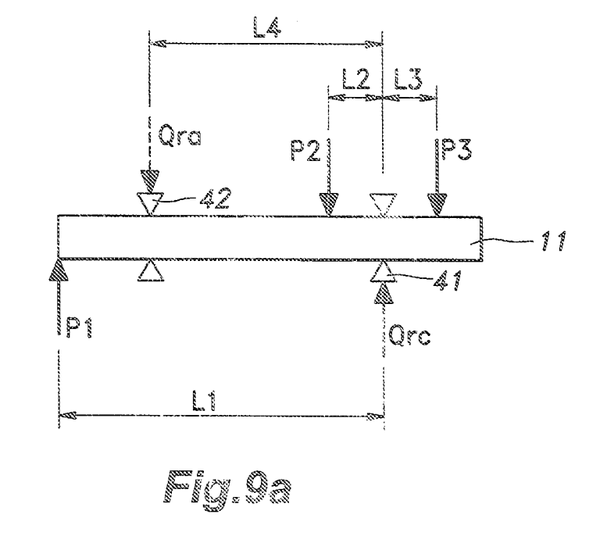
FIGS. 9*a* and 9*b* are diagrams showing the mode of loading on the radial bearings.

The drive balancer shaft 11 is supported solely by the two bearings 41 and 42 formed in the balancer housing 30, and the front bearing 42 is axially offset toward the small sprocket 7. Therefore, the load on the front bearing 42 is relatively low as can be readily appreciated by evaluating the sum of moments about the first bearing 41 as illustrated in FIG. 9a.

$$P1 \cdot L1 + P3 \cdot L3 = Qra \cdot L4 + P2 \cdot L2 \qquad (1)$$

where Qra is the bearing reaction force of the second bearing 42, P1 the tension of the link chain 8, P3 the centrifugal force of the rear balancer weight part, and P2 the centrifugal force of the front balancer weight part.

As P2=P3 and L2=L3 in this case, $$Qra = P1 \cdot L1/L4 \qquad (2)$$

Therefore, the greater L4 is, the smaller the bearing reaction force Qra of the second bearing 42 becomes.

Figure 9B:
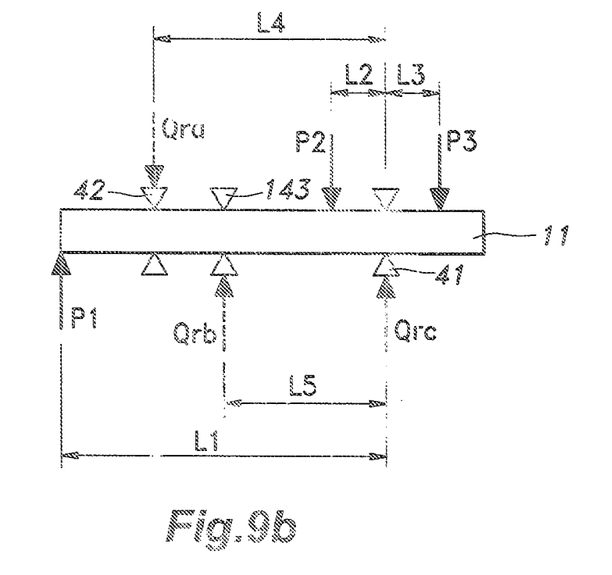
Figure 10:
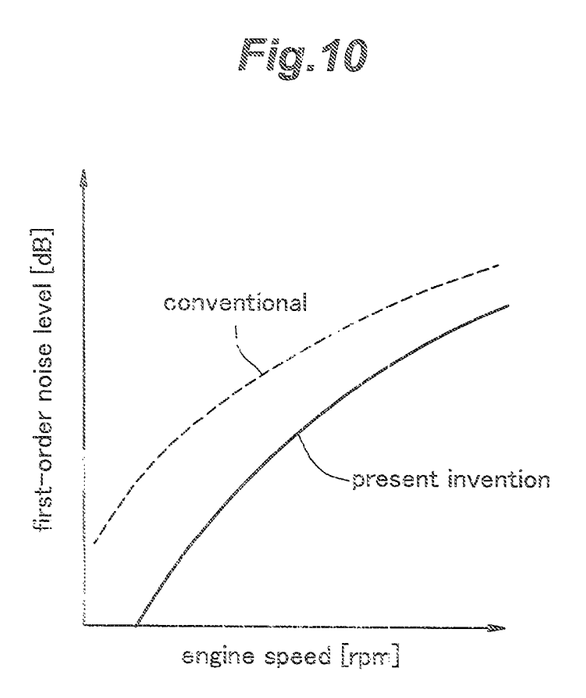
FIG. 10 is a graph showing the first-order noise levels of the balancer device according to the present invention and the conventional balancer device.

Furthermore, adding a third bearing does not necessarily reduce the bearing load on the second bearing 42. Suppose that an additional bearing 143 is present between the first and second bearings 41 and 42 (at the position corresponding to the second bearing 44 of the driven balancer shaft 21) as shown in FIG. 9b. The second bearing 42 is additionally subjected to the reaction of the load that is applied to the third bearing 143, in addition to the tension P1 of the link chain 8. Therefore, the second bearing 42 of this hypothetical example (shown in FIG. 9h) is subjected to a greater load and hence a greater friction as compared with the second bearing 42 of the illustrated embodiment (shown in FIG. 9a).

In the case of the hypothetical example illustrated in FIG. 9b, the balance of moments about the first bearing 41 can be given by the following equation (3).

$$Qra \cdot L4 + P2 = L2 = P1 \cdot L1 + P3 \cdot L3 + Qrb \cdot L5 \qquad (3)$$

where Qrb is the bearing reaction force of the third bearing 143. Therefore, the bearing reaction force Qra of the second bearing 42 can be given by the following equation (4).

$$Qra = (P1 \cdot L1 + Qrb \cdot L5)/L4 \qquad (4)$$

Therefore, the bearing reaction force Qra of the second bearing 42 of the illustrated embodiment is smaller than the bearing reaction force Qra of the second bearing 42 of the hypothetical example by the bearing reaction force Qrb supported by the third bearing 143. Therefore, by suitably placing the second bearing 42 and not adding a third bearing, the load on the second bearing 42 subjected to the tension of the chain link can be minimized, and the balancer device can be constructed both compact and light-weight.

In the illustrated embodiment, the bearing reaction force Qra of the second bearing 42 is kept small, but the bearing reaction force Qrc of the first bearing 41 becomes relatively great. Therefore, in the illustrated embodiment, the first bearing 41 is given with a relatively large width (and hence a relatively high stiffness), and a special arrangement is made for the oil passage for the first bearing 41. Conventionally, the bearing between the two balancer weight parts of each balancer shaft was lubricated by feeding lubricating oil from an oil source to the bearing for one of the balancer shafts, and feeding the lubricating oil therefrom to the adjacent bearing of the other balancer shaft. Therefore, the bearing at the upstream end of the oil supply path may be favorably lubricated, but the bearing at the downstream end may not be favorably lubricated if the consumption of lubricating oil at the upstream bearing is excessive, typically due to a large gap or clearance in the upstream bearing. Therefore, in the illustrated embodiment, of the bolt holes provided in the upper housing 32 for securing the lower housing 31 to the upper housing 32, the one 19 located in the first bearing wall 46 between the two balancer shafts 11 and 21 is used as a passage for distributing lubricating oil to the two bearings 41 and 43 formed in the first bearing wall 46 so that the two bearings 41 and 43 for the balancer shafts 11 and 21 may be evenly lubricated.

In the illustrated embodiment, the pump housing 51 receives the oil pump 60 therein such that the oil pump 60 is rotatably supported solely by the pump housing 51. More specifically, the outer rotor 62 is rotatably supported by the inner circumferential wall of the pump chamber 63 without providing a journal bearing for the outer rotor 62 in the pump housing 51. Therefore, even when the pump cover 56 is assembled to the balancer device 10 which is already fully assembled, the axial center of the outer rotor 62 can be aligned with the axial center of the driven balancer shaft 21 without fail.

In the illustrated embodiment, because the second bearing 42 for the drive balancer shaft 11 is offset toward the small sprocket 7 with respect to the second bearing 44 of the driven balance shaft 21 which is located on the side of the oil pump 60, the drive balancer shaft 11 is supported at a part thereof adjacent to the small sprocket 7. Therefore, the drive balancer shaft 11 can be supported with a high stiffness against the force applied by the chain link 8 to the sprocket 7.

The pump housing 51 integrally formed with the lower housing 31 is provided with the first lateral extension 52 that internally defines the outlet passage 69 for the oil pump 60 therein, and the lower half 42a of the second bearing 42 for the drive balancer shaft 11 which is located closer to the small sprocket 7 than the first bearing 43 for the drive balancer shaft 11 is located in an upper part of the first lateral extension 52. Therefore, the second bearing 42 for the drive balancer shaft 11 is located adjacent to a part where the balancer housing 30 and the pump body 64 are joined to each other, and this contributes to achieving a high support stiffness for the drive balancer shaft 11.

The balancer housing 30 is configured such that a part of the driven balancer shaft 21 is exposed from a gap defined between the pump housing 51 and the main part of the balancer housing 30, and the pump housing 30 is provided with a third bearing 45 consisting of a bearing bore for rotatably supporting the pump shaft 28 or the third journal 26 thereof. Therefore, not only the weight of the balancer housing 30 is minimized but also the bearing load for the oil pump 60 is favorably supported because the driven balancer shaft 21 is additionally supported by the pump housing 51 integrally formed with the balancer housing 30.

In the illustrated embodiment, because each balancer shaft carries the balancer weight divided into two parts that are located on either side of the first journal portion which is supported by the first bearing formed on the first bearing wall such that the bearing wall provides a pair of thrust bearings for supporting the balancer shaft against either axial movement, the balancer device 10 is simplified in structure, and reduced in weight. Furthermore, because the driven balancer shaft 21 is connected to the pump shaft 28 via the coupling 27, the assembling of the balancer shafts is simplified. More specifically, with the pump shaft 28 already in place, the driven balancer shaft 21 may be placed on the lower halves of the bearings on the lower housing 31 by causing the key 27a to slide laterally into the groove 27b.

The recess 65 and the axial passage 67 are communicated with each other via a plurality of (two) communication holes 66, the cross sectional area of the communication path can be made adequately large without increasing the vertical dimensions of the cylindrical wall 37 and the tubular wall 38 or unduly reducing the mechanical strength and stiffness of the adjacent part. If the cross sectional area of the communication path is too small, the oil pump 60 could suffer from cavitation which is known to cause various problems such as erosion of pump components, reduction in the output pressure and generation of noises due to pulsation in the inlet flow. On the other hand, according to the present invention, the cross sectional area of the communication flow path is enabled to be maximized without unduly reducing the mechanical strength of the balancer housing by providing a plurality of communication holes 66 between the recess 65 and the axial passage 67 (inlet passage of the pump). FIG. 9 compares the noise level of the illustrated embodiment with an example for comparison which is provided with only one communication hole between the recess and the axial passage. Owing to the reduction in the generation of noises, the ribs that are often formed in the corners and bottom wall of the oil pan for the purpose of reducing the noises generated from the oil pump may be eliminated, without any problem.

Furthermore, because the communication holes 66 can be formed simply by drilling, any special costly manufacturing process is not required. Because the communication holes 66 are separated by a part of the partition wall, an adequate stiffness of the cylindrical wall and the surrounding area is ensured, as opposed to the case where only one such communication hole is formed. In particular, if a single communication hole with a larger diameter is used in order to ensure an adequate cross sectional area of the communication flow path, the stiffness of the cylindrical wall is reduced to such an extent that it is not practical to provide the ribs 18 that connect the adjoining boss portion 17 with the cylindrical wall 37. According to the illustrated embodiment, the cylindrical wall 37 is given with an adequate stiffness owing to the use of the two communication holes 66 laterally adjoining each other such that the fastening strength of the balancer housing 30 can be improved by providing the ribs 18 that connect the adjoining boss portion 17 with the cylindrical wall 37 in a highly effective manner.

In the illustrated embodiment, the tubular wall 38 is formed laterally next to the cylindrical wall 37, and the circular communication holes 66 are arranged along the axial direction, not only the depth (length) of each circular communication holes 66 can be minimized but also the diameter of each circular communication hole 66 can be maximized without increasing the vertical dimension of the cylindrical wall 37 and the tubular wall 38. In other words, the circular communication holes 66 afford a large cross sectional area for the communication flow path, and are yet easy to form.

In the illustrated embodiment, because the tubular wall 38 is formed on a side of the lower housing 31, and is located between the interface 30a between the lower housing 31 and the upper housing 32, and the lower end surface of the lower housing 31, the provision of the tubular wall 38 in no way increases the vertical dimension of the balancer housing 30. Therefore, the depth of the oil pan is not required to be increased, and the overall height of the engine can be minimized. Even though the vertical dimension of the tubular wall 38 is relatively small, the axial passage 67 is allowed to interface with the recess 65 within the cylindrical wall 37 over a large area so that a relatively large number of communication holes 66 can be formed, and the diameter of each communication hole can be maximized. Also, the finishing of the interface 30a between the lower housing 31 and the upper housing 32 is not complicated by the provision of the tubular wall 38.

Because the tubular wall 38 is integrally joined to the shaft surrounding wall 35 of the lower housing 31 surrounding the balancer shafts 11 and 21, the tubular wall 38 is given with a high stiffness. Furthermore, a part of the tubular wall 38 extends between the balancer housing (lower housing) and the pump housing, and this also contributes to the increase in the stiffness of both the tubular wall and the pump housing.

Although the present invention has been described in terms of a preferred embodiment thereof, it is obvious to a person skilled in the art that various alterations and modifications are possible without departing from the scope of the present invention which is set forth in the appended claims. For instance, the present invention was applied to an inline, four-cylinder engine, but may also be applied to internal combustion engines of various other types without departing from the spirit of the present invention.

The contents of the original Japanese patent applications on which the Paris Convention priority claim is made for the present application as well as the contents of the prior art references mentioned in this application are incorporated in this application by reference.

The invention claimed is:

1. A balancer device for an internal combustion engine, comprising:
   a pair of balancer shafts, including, a drive balancer shall and a driven balancer shaft, each incorporated with a balancer weight and disposed in parallel to each other, the two balancer shafts being coupled such that the two balancer shafts rotates both at twice the rotational speed of the engine in opposite directions;
   a lower housing including a pair of bearing lower halves for each balancer shaft;
   an upper housing configured to be joined to the lower housing so as to form a balancer housing, the upper housing including bearing upper halves corresponding to the bearing lower halves of the lower housing for jointly forming radial bearings for the balancer shafts;
   a pump housing integrally formed at an axial end of one of the upper and lower housings as an integral extension thereof to internally define a part of a pump chamber of an oil pump;
   a pump cover joined to the pump housing from an outer axial end thereof to jointly define the pump chamber with the pump housing; and
   a pump rotor received in the pump chamber;
   wherein an axial end of the driven balancer shaft adjoining the pump housing is coupled with the pump rotor, and an axial end of the drive balancer shaft is provided with a member which is configured to be actuated by a crankshaft of the engine, the radial bearings for the balancer shafts being formed solely in the balancer housing and/or an integral extension thereof
   wherein a number of radial bearings supporting the drive balancer shaft is smaller than a number of radial bearings supporting the driven balancer shaft, and
   wherein a distance between the radial bearings formed by the upper housing and the lower housing for the drive balancer shaft is larger than a distance between the radial bearings formed by the upper housing and the lower housing for the driven balancer shaft.

2. The balancer device according to claim 1, wherein the oil pump is received in the pump housing, and the pump rotor is connected to the axial end of the driven balancer shaft via a detachable shaft coupling.

3. The balancer device according to claim 1, wherein the radial bearing for the drive balancer shaft most adjacent to the pump housing is offset toward the pump housing than the radial bearing for the driven balancer shaft most adjacent to the pump housing.

4. The balancer device according to claim 3, wherein the balancer housing is provided with four radial bearings for the two balancer shafts, two formed in a common bearing wall extending perpendicularly to the balancer shafts in an axial end of the balancer housing remote from the pump housing, and remaining two formed in an axial end of the balancer housing adjacent to the pump housing in a mutually axially offset manner.

5. The balancer device according to claim 1, wherein the pump housing is formed integrally with the lower housing, and includes a lateral extension internally defining an oil passage for the oil pump jointly with the pump cover,
   wherein the radial bearings for the drive balancer comprise a first radial bearing formed by a part of the balancer housing remote from the member configured to be actuated by the crankshaft and a second radial bearing formed jointly by a part of the lateral extension of the pump housing and a vertically opposing part of the upper housing,
   wherein the pump housing and the lateral extension thereof define a common plane for mounting the pump cover thereon, and
   wherein the second radial bearing for the drive balancer shaft is located axially internally of the common plane.

6. The balancer device according to claim 2, wherein a part of the axial end of the driven balancer shaft adjacent to the pump housing is exposed from the balancer housing, and the pump housing is provided with a radial bearing for rotatably supporting a pump shaft extending from the pump rotor.

7. The balancer device according to claim 6, wherein one of the radial bearings for the driven balancer shaft is formed in a bearing wall of the balancer housing, and the driven balancer shaft includes a journal supported by the said radial bearing and pair of balancer weight parts of the balancer weight formed on either side of the journal so as to be engaged by end surfaces of the bearing wall, and wherein the axial end of the driven balancer shaft adjacent to the pump housing is coupled with an opposing axial end of the pump shaft via a shaft coupling that can be engaged and disengaged by a relative lateral movement between the two opposing axial ends of the driven balancer shaft and the pump shaft.

8. The balancer device according to claim 1, wherein the radial bearing formed in the end of the balancer housing adjacent to the pump housing for the driven balancer shaft is formed in an end wall of the balancer housing, and the radial bearing formed in the end of the balancer housing adjacent to the pump housing for the drive balancer shaft is formed in a lateral extension of the pump housing.

9. The balancer device according to claim 1, wherein the balancer housing includes a tubular wall extending along a side of the balancer housing adjacent to the driven balancer shaft and internally defining an axial passage, and a cylindrical wall extending downward from a bottom wall of the balancer housing in a contiguous relationship so as to serve as a strainer mount, a communication hole being passed through a partition wall separating a recess defined inside the cylindrical wall and the axial passage.

10. The balancer device according to claim 9, wherein at least two communication holes are passed through the partition wall separating the recess defined inside the cylindrical wall and the axial passage, one next to the other along the axial direction.

11. The balancer device according to claim 9, wherein the upper and lower housings are separated by a substantially horizontal interface, and the tubular wall is disposed between the interface and an effective bottom surface of the lower housing in terms of elevation.

12. The balancer device according to claim 9, wherein the lower housing is provided with a pair of part cylindrical wall parts in a bottom wall part thereof so as to correspond to the two balancer shafts, and the tubular wall is at least partly directly connected to one of the part cylindrical wall part.

* * * * *